US011653017B2

(12) United States Patent
He et al.

(10) Patent No.: US 11,653,017 B2
(45) Date of Patent: May 16, 2023

(54) METHOD, VIDEO PROCESSING APPARATUS, DEVICE, AND MEDIUM FOR ESTIMATING A MOTION VECTOR OF A PIXEL BLOCK

(71) Applicant: AMLOGIC (SHANGHAI) CO., LTD., Shanghai (CN)

(72) Inventors: Zhihong He, Shanghai (CN); Tao Ji, Shanghai (CN); Chun Wang, Shanghai (CN); Dongjian Wang, Shanghai (CN); Xuyun Chen, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/305,751

(22) Filed: Jul. 14, 2021

(65) Prior Publication Data

US 2022/0021898 A1  Jan. 20, 2022

(30) Foreign Application Priority Data

Jul. 16, 2020 (CN) .......................... 202010687720.5

(51) Int. Cl.
*H04N 7/12* (2006.01)
*H04N 19/513* (2014.01)
(Continued)

(52) U.S. Cl.
CPC ......... *H04N 19/513* (2014.11); *H04N 19/132* (2014.11); *H04N 19/137* (2014.11); *H04N 19/176* (2014.11)

(58) Field of Classification Search
CPC .. H04N 19/513; H04N 19/132; H04N 19/137; H04N 19/176; H04N 19/521; H04N 19/139; H04N 19/53
(Continued)

(56) References Cited

U.S. PATENT DOCUMENTS

2011/0170597 A1* 7/2011 Shi ....................... H04N 19/132
                                                  375/240.16
2015/0256850 A1* 9/2015 Kottke ................ H04N 19/513
                                                  375/240.16
(Continued)

OTHER PUBLICATIONS

Extended European Search Report from related Application No. 21186131.5, dated Dec. 16, 2021.
(Continued)

*Primary Examiner* — Gims S Philippe
(74) *Attorney, Agent, or Firm* — Grossman, Tucker, Perreault & Pfleger, PLLC

(57) ABSTRACT

A method for estimating a motion vector of a pixel block, a video processing apparatus, an electronic device and a storage medium. The method for estimating the motion vector of the pixel block includes: obtaining a plurality of candidate motion vectors of a current pixel block in a current video frame, the plurality of candidate motion vectors comprising at least a down-sampled candidate motion vector; calculating a confidence degree for a difference value between each of other candidate motion vectors except for the down-sampled candidate motion vector in the plurality of candidate motion vectors and the down-sampled candidate motion vector; and determining one candidate motion vector in the other candidate motion vectors as the motion vector of the current pixel block, the confidence degree for the difference value between the one candidate motion vector and the down-sampled candidate motion vector is highest.

15 Claims, 3 Drawing Sheets

(51) Int. Cl.
*H04N 19/132* (2014.01)
*H04N 19/137* (2014.01)
*H04N 19/176* (2014.01)

(58) Field of Classification Search
USPC .................................................. 375/240.12
See application file for complete search history.

(56) References Cited

U.S. PATENT DOCUMENTS

| | | | |
|---|---|---|---|
| 2019/0045211 A1* | 2/2019 | Pohl .................... | H04N 19/577 |
| 2019/0045223 A1* | 2/2019 | Levy .................... | H04N 19/137 |
| 2019/0164296 A1* | 5/2019 | Chikkerur ............... | G06T 7/223 |
| 2019/0215518 A1* | 7/2019 | Alagappan ............. | H04N 19/53 |
| 2021/0327022 A1* | 10/2021 | Yu ............................ | G06T 5/002 |
| 2021/0409754 A1* | 12/2021 | Sethuraman ......... | H04N 19/533 |

OTHER PUBLICATIONS

Stiller et al., "Estimating Motion in Image Sequences—A Tutorial on Modeling and Computation of 2D Motion", IEEE Signal Processing Magazine, IEEE, USA, Jul. 1, 1999, pp. 70-91.

Arun et al., "A CODEC for HDTV", IEEE Transactions on Consumer Electronics, IEEE Service Center, USA, vol. 38, No. 3, Aug. 1, 1992, pp. 325-340.

* cited by examiner

METHOD, VIDEO PROCESSING APPARATUS, DEVICE, AND MEDIUM FOR ESTIMATING A MOTION VECTOR OF A PIXEL BLOCK

CROSS-REFERENCE TO RELATED APPLICATIONS

This present application claims priority to Chinese Patent Application No. 202010687720.5 entitled "METHOD, VIDEO PROCESSING APPARATUS, DEVICE, AND MEDIUM FOR ESTIMATING A MOTION VECTOR OF A PIXEL BLOCK" and filed with the CNIPA on Jul. 16, 2020, the content of which is incorporated herein by reference in its entirety.

FIELD

The present disclosure relates to the technical field of image processing, and more particularly, to a method for estimating a motion vector of a pixel block, a video processing apparatus, an electronic device and a non-transitory computer storage medium.

BACKGROUND

A frame rate at which a video is displayed may be higher than that of a video source, therefore a processing step of increasing the frame rate of the video source would be performed. For example, a video of 24 Hz is processed to output a video of 60 Hz. Increasing the frame rate of a video may reduce jitters and provide a more fluent and smooth visual effect.

If a frame rate of a video is increased only by repeating an original frame of the video, the video would still jitter. Therefore, a method of motion estimation and motion compensation is adopted to increase the frame rate. The quality of a frame rate conversion mainly depends on reliability of a motion estimation algorithm, and information on a frame to be interpolated is calculated from a motion vector obtained by the motion estimation algorithm.

In a practical application, each frame of picture is generally divided into a plurality of non-overlapping blocks having a same size for motion estimation and motion compensation processing. Estimating a motion vector of a block may generate a plurality of candidate motion vectors, and a matching error of two blocks to which each candidate motion vector points may determine reliability of the motion vector to a certain extent. However, when there are a plurality of candidate motion vectors with the minimum block matching error, if the finally selected motion vector is not appropriate, there is still a phenomenon in which a video jitters or is not fluent, which reduces video playing quality.

SUMMARY

The present disclosure aims to at least solve one of technical problems in the prior art. To this end, one object of the present disclosure is to provide a method for estimating a motion vector of a pixel block. The method may obtain a more correct motion vector from candidate motion vectors, improve reliability of motion estimation, reduce video jitters or unsmoothness, and improve a video playing effect.

A second object of the present disclosure is to provide a non-transitory computer storage medium.

A third object of the present disclosure is to provide a video processing apparatus.

A fourth object of the present disclosure is to provide an electronic device.

In order to realize the above objects, in an embodiment of a first aspect of the present disclosure, a method for estimating a motion vector of a pixel block is provided. The method includes: obtaining a plurality of candidate motion vectors of a current pixel block in a current video frame, the plurality of candidate motion vectors including at least a down-sampled candidate motion vector; calculating a confidence degree of each of other candidate motion vectors except for the down-sampled candidate motion vector in the plurality of candidate motion vectors with respect to the down-sampled candidate motion vector; and determining the candidate motion vector in the other candidate motion vectors which has a highest confidence degree with respect to the down-sampled candidate motion vector as the motion vector of the current pixel block.

In the method for estimating the motion vector of the pixel block according to the embodiment of the present disclosure, taking the down-sampled candidate motion vector as a reference motion vector can improve the estimation speed and the reliability. The higher the confidence degree for a difference value between one candidate motion vector and the down-sampled candidate motion vector is, the closer the one candidate motion vector gets to the down-sampled candidate motion vector, that is the more reliable the one candidate motion vector will be. One candidate motion vector in the other candidate motion vectors is determined as the final motion vector of the current pixel block, the confidence degree for the difference value between the one candidate motion vector and the down-sampled candidate motion vector being the highest. Thus, it can not only ensure reliability of the obtained motion vector, but also can ensure accuracy of the motion vector, thereby improving reliability of motion estimation, reducing video jitters and unsmoothness, and improving video quality.

In some embodiments, the obtaining the plurality of candidate motion vectors of the current pixel block in the current video frame includes: obtaining a down-sampled frame image of the current video frame; dividing the down-sampled frame image into a plurality of candidate blocks of a same size; and calculating, using a hierarchical search algorithm, the down-sampled candidate motion vector of the current pixel block.

In some embodiments, the obtaining the plurality of candidate motion vectors of the current pixel block in the current video frame further includes: taking a block region in the current video frame, the motion vector of which has been estimated, as a spatial recursive search region of the current pixel block; and providing recursively the motion vector of each candidate block in the spatial recursive search region to the current pixel block of the current video frame using a spatial recursive method, so as to serve as a spatial recursive candidate motion vector of the current pixel block.

In some embodiments, the obtaining the plurality of candidate motion vectors of the current pixel block in the current video frame further includes: taking, in a video frame immediately preceding the current video frame, a block region scanned after a temporally adjacent pixel block corresponding to the current pixel block as a time recursive search region of the current pixel block; providing recursively the motion vector of each candidate block in the time recursive search region to the current pixel block of the current video frame using a time recursive method, so as to serve as a time recursive candidate motion vector of the current pixel block.

In some embodiments, the obtaining the plurality of candidate motion vectors of the current pixel block in the current video frame further includes: obtaining a recursive motion vector of a pixel block at a position set in a preset neighborhood around the current pixel block; and adding a random motion offset to the recursive motion vector to obtain a random candidate motion vector of the current pixel block.

In some embodiments, the calculating the confidence degree of each of the other candidate motion vectors except for the down-sampled candidate motion vector in the plurality of candidate motion vectors with respect to the down-sampled candidate motion vector includes:

calculating an absolute value of a first difference value between the spatial recursive candidate motion vector and the down-sampled candidate motion vector, and obtaining a first confidence degree of the spatial recursive candidate motion vector with respect to the down-sampled candidate motion vector according to the absolute value of the first difference value;

calculating an absolute value of a second difference value between the temporal recursive candidate motion vector and the down-sampled candidate motion vector, and obtaining a second confidence degree of the temporal recursive candidate motion vector with respect to the down-sampled candidate motion vector according to the absolute value of the second difference value; and calculating an absolute value of a third difference value between the random candidate motion vector and the down-sampled candidate motion vector, and obtaining a third confidence degree of the random candidate motion vector with respect to the down-sampled candidate motion vector according to the absolute value of the third difference value.

In some embodiments, the determining the candidate motion vector in the other candidate motion vectors which has the highest confidence degree with respect to the down-sampled candidate motion vector as the motion vector of the current pixel block includes: obtaining a highest confidence degree among the first confidence degree, the second confidence degree, and the third confidence degree; and determining the candidate motion vector corresponding to the highest confidence degree as the motion vector of the current pixel block.

In order to realize the above objects, in an embodiment of a second aspect of the present disclosure, a non-transitory computer storage medium is provided. The non-transitory computer storage medium has a computer program stored thereon. The computer program, when executed by a processor, implements the method for estimating the motion vector of the pixel block.

In order to realize the above objects, in an embodiment of a third aspect of the present disclosure, a video processing apparatus is provided. The video processing apparatus includes a processor and a memory communicatively connected to the processor. The memory stores a computer program executable by the processor. The computer program when executed by the processor, implements the method for estimating the motion vector of the pixel block.

In order to realize the above objects, in an embodiment of a fourth aspect of the present disclosure, an electronic device is provided. The electronic device includes an image display apparatus and the video processing apparatus. The video processing apparatus is connected to the image display apparatus.

The electronic device in the embodiment of the present disclosure, by using the video processing apparatus in any of the above embodiments and taking the down-sampled candidate motion vector as a reference motion vector, can improve the estimation speed and the reliability. The higher the confidence degree for a difference value between one candidate motion vector and the down-sampled candidate motion vector is, the closer the one candidate motion vector gets to the down-sampled candidate motion vector, that is, the more reliable the one candidate motion vector will be. One candidate motion vector in the other candidate motion vectors is determined as the final motion vector of the current pixel block, the confidence degree for the difference value between the one candidate motion vector and the down-sampled candidate motion vector being highest. Thus, it can not only ensure reliability of the obtained motion vector, but also can ensure accuracy of the motion vector, thereby improving reliability of motion estimation, reducing video jitters and improving video quality.

Additional aspects and advantages of the present disclosure will be given partially in the following description, and will become apparent partially from the following description, or will be known from the practice of the present disclosure.

BRIEF DESCRIPTION OF DRAWINGS

The above and/or additional aspects and advantages of the present disclosure will become apparent and readily appreciated from the description of embodiments in conjunction with the accompanying drawings, in which.

REFERENCE NUMERALS

100: electronic device; 10: video processing apparatus; 20: image display apparatus; 11: processor; 12: memory.

DETAILED DESCRIPTION

Hereinafter, embodiments of the present disclosure will be described in detail. The embodiments described below with reference to the accompanying drawings are exemplary. Embodiments of the present disclosure will be described in detail below.

In order to reduce jitters and provide a more fluent and smooth visual effect, electronic devices such as televisions and computers will increase a frame rate of a video source when processing a video stream. For example, the method of motion estimation and motion compensation is adopted to increase the frame rate. A basic idea of the motion estimation is dividing each frame in an image sequence into a plurality of non-overlapping macro blocks, considering that displacement amounts of all the pixels in the macro block is the same and then finding, regarding each macro block, a block most similar to a current block in a given specific search range in a reference frame according to a certain matching criterion, that is, finding a matching block, the relative displacement between the matching block and the current block being a motion vector.

When performing a motion estimation on a certain pixel block, it can estimate a plurality of possibly correct motion vectors for the current pixel block, that is, candidate motion vectors. A most appropriate motion vector is selected from these candidate motion vectors as the motion vector of the current pixel block. Embodiments of the present disclosure provide a method for estimating a motion vector of a pixel. In the method, in addition to a criterion in which a block matching error is used to judge reliability of a plurality of estimated candidate motion vectors, another criterion is added for judging the reliability of the candidate motion vectors, thereby improving accuracy of block motion estimation.

A method for estimating a motion vector of a pixel block according to an embodiment of the present disclosure will be described below with reference to FIGS. 1 to 4.

Figure 1:
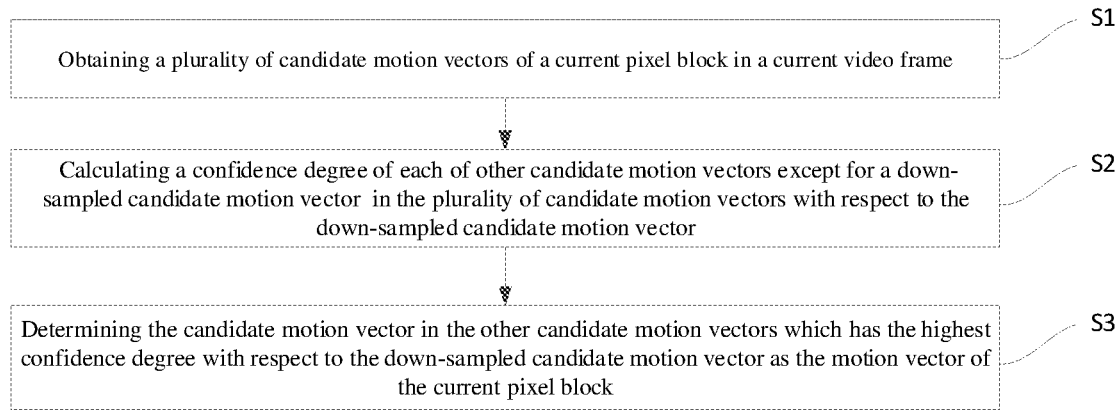
FIG. 1 is a flowchart showing a method for estimating a motion vector of a pixel block according to an embodiment of the present disclosure.

FIG. 1 is a flowchart showing a method for estimating a motion vector of a pixel block according to an embodiment of the present disclosure. As shown in FIG. 1, the method for estimating the motion vector of the pixel block according to the embodiment of the present disclosure at least includes steps S1 to S3, and each step is specifically as follows.

At step S1, a plurality of candidate motion vectors of a current pixel block in a current video frame are obtained.

For example, since one moving object would cover a plurality of pixel blocks, the motion vectors of pixel blocks which are adjacent to each other in a spatial domain have a strong correlation, and the motion vectors of the corresponding pixel blocks of frames which are adjacent to each other in a time domain also have a strong correlation. In an embodiment, a three-dimensional recursive search algorithm such as spatial recursive and temporal recursive methods may be adopted to estimate a motion vector of a current pixel block within a search range, and the estimated motion vector is taken as a candidate motion vector.

Alternatively, in other embodiments, a motion vector of a current pixel block may be obtained by adding an offset to the motion vector obtained by the spatial and temporal recursions, and may also be taken as a candidate motion vector. Alternatively, other search methods may be adopted to obtain a candidate motion vector of a current pixel block.

In an embodiment, a hierarchical search algorithm is adopted to obtain a down-sampled candidate motion vector of a current pixel block as a candidate motion vector.

At step S2, a confidence degree of each of other candidate motion vectors except for a down-sampled candidate motion vector in the plurality of candidate motion vectors with respect to the down-sampled candidate motion vector is calculated.

At step S3, the candidate motion vector in the other candidate motion vectors which has the highest confidence degree with respect to the down-sampled candidate motion vector is determined as the motion vector of the current pixel block.

In an embodiment, a hierarchical search algorithm is adopted to obtain a down-sampled candidate motion vector. That is, a current frame image is downsampled to obtain a lower-resolution image, and a motion vector of each pixel block on the lower-resolution image is estimated. In other words, a down-sampled frame image of a current video frame is obtained, the down-sampled frame image is divided into a plurality of candidate blocks of a same size, and a block matching error between each candidate block in a search region in the down-sampled frame image and a current pixel block is calculated. Then, a target candidate block having a minimum matching error with respect to the current pixel block is determined, and a motion vector between the current pixel block and the target candidate block is estimated as the down-sampled candidate motion vector.

The down-sampled frame image, i.e., the lower-resolution image, is divided into several pixel blocks of the same size. In comparison with a higher-resolution image, the number of data blocks is significantly reduced, which can speed up the block matching and improve the processing speed.

Figure 2A:
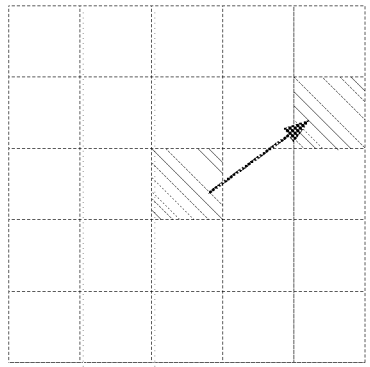
FIGS. 2A and 2B are schematic diagrams showing search blocks of a down-sampled frame image and an original image respectively according to an embodiment of the present disclosure.
Figure 2B:
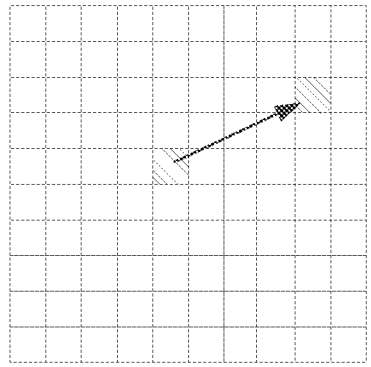

As shown in FIG. 2A, a pixel block indicated at oblique lines in FIG. 2A represents a search block of a down-sampled frame image. As shown in FIG. 2B, a pixel block indicated at oblique lines in FIG. 2B represents a search block of an original image. It can be seen from FIGS. 2A and 2B that the search block of the down-sampled frame image has a wider range than that of the search block of the original image, therefore the motion vectors obtained by motion estimation in a flat area has a better consistency, but has a lower accuracy than the motion vectors obtained by searching in the original image.

In the motion estimation method, it is considered that the consistency of motion vectors of the down-sampled frame image is relatively high. In comparison with other candidate motion vectors, reliability of the down-sampled candidate motion vector obtained by the hierarchical search algorithm is relatively high. Although a hierarchically searched pixel block and a pixel block of the full resolution image have the same size, they have different image information contained therein. The image information of the block of the down-sampled frame image is more abundant, and the motion vector obtained by motion estimation can correctly reflect a motion trend of the current pixel block. However, because the pixel block obtained by the hierarchical search algorithm is a down-sampled pixel block, the accuracy of the motion vector obtained by the hierarchical search algorithm is not high. Therefore, in the embodiment of the present disclosure, the down-sampled candidate motion vector obtained using the hierarchical search algorithm is used as a reference motion vector of the current pixel block, the confidence degree for a difference value between the motion vector obtained by the hierarchical search algorithm and each of the other candidate motion vectors is calculated, and the reliability of each of the candidate motion vectors is determined.

In an embodiment, reliability of each of the other candidate motion vectors with respect to the down-sampled candidate motion vector obtained by the hierarchical search algorithm may be determined by the following formula:

$$\text{conf}_i = 100 - \min(\alpha \times \text{abs}(cmv_i - hmv), 100), i=1, 2, \ldots m \quad \text{formula (1)},$$

where $\text{conf}_i$ denotes the confidence degree of an $i^{th}$ candidate motion vector cmv hmv denotes the down-sampled candidate motion vector, and a denotes a confidence degree coefficient.

Figure 3:
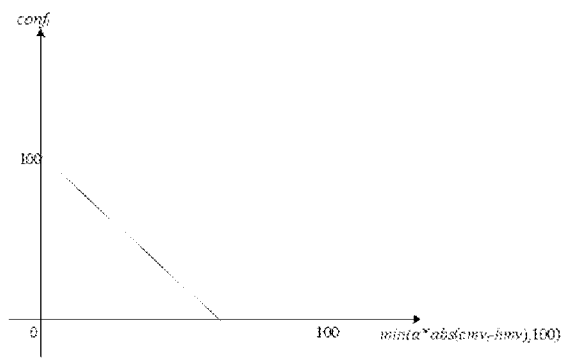
FIG. 3 is a schematic diagram showing a curve indicating a relationship between a confidence degree and a difference value between the down-sampled candidate motion vector and other candidate motion vector according to an embodiment of the present disclosure.

FIG. 3 is a schematic diagram showing a curve indicating a relationship between the confidence degree and the difference value between the down-sampled candidate motion vector and the other candidate motion vector according to an embodiment of the present disclosure. As shown in FIG. 3, it can be seen that the larger the difference value between one of the other candidate motion vectors and the down-sampled candidate motion vector is, the lower the confidence degree of the one candidate motion vector is, and the lower the likelihood of the one candidate motion vector being determined as a final motion vector of the current pixel block is. Accordingly, in the method for estimating a motion vector of a pixel block according to the embodiment of the present disclosure, the confidence degree for the difference value between each of the other candidate motion vectors and the down-sampled candidate motion vector and a block matching error for a candidate motion vector jointly determine the motion vector of the current block.

Taking the down-sampled candidate motion vector as a reference motion vector can improve the estimation speed and the reliability. The higher the confidence degree for a difference value between one candidate motion vector and the down-sampled candidate motion vector is, the closer the one candidate motion vector gets to the down-sampled candidate motion vector, that is the more reliable the one candidate motion vector will be. One candidate motion vector in the other candidate motion vectors is determined as the final motion vector of the current pixel block, the confidence degree for the difference value between the one candidate motion vector and the down-sampled candidate motion vector being highest. Thus, it can not only ensure reliability of the obtained motion vector, but also can ensure accuracy of the motion vector, thereby improving reliability of motion estimation, reducing video jitters and improving video quality.

In an embodiment, when performing a motion estimation on a certain pixel block, it can estimate a plurality of possibly correct motion vectors for the current pixel block, i.e., candidate motion vectors. The down-sampled candidate motion vector is taken as a reference motion vector, and a most appropriate motion vector is selected from the other candidate motion vectors according to the above method and is taken as the motion vector of the current pixel block. In this way, the reliability of the motion vector of the current pixel block may be ensured, the accuracy of the motion vector may be ensured, and the precision of the motion estimation can be improved.

In an embodiment, the candidate motion vectors of the current pixel block may include the down-sampled candidate motion vector mentioned above and the other candidate motion vectors, for example, the spatial recursive candidate motion vectors obtained using a spatial recursive algorithm and the temporal recursive candidate motion vectors obtained using a temporal recursive algorithm.

In the process of estimating the motion vector, the motion vector of each pixel block is estimated from top to bottom and from left to right on the current video frame image.

In some embodiments, a motion vector for spatial recursion of the current pixel block may be expressed as the following formula:

$$MV_{spatial}\{MV_{r+i,c+j}|(i<0 \text{ or } (i=0 \text{ and } j<0), (i,j) \in \Omega_s)\}, \quad \text{formula (2)},$$

where $\Omega_s$ denotes a search range in a spatial domain which is specified around the current pixel block, (r, c) denotes a position of the current pixel block, (r+i, c+j) denotes the position of a block within the specified search range, and $MV_{spatial}$ denotes the spatial recursive candidate motion vector of the current pixel block.

Figure 4:
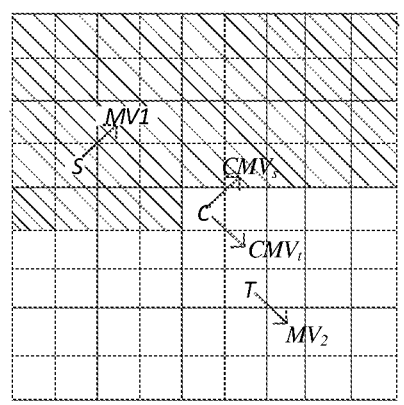
FIG. 4 is a schematic diagram showing estimation of a search range of a motion vector of a current pixel block using a recursive search algorithm according to an embodiment of the present disclosure.

FIG. 4 is a schematic diagram showing estimation of a search range of a motion vector of a current pixel block by using a recursive search algorithm according to an embodiment of the present disclosure. As shown in FIG. 4, a block region in the current video frame, a motion vector of which has been estimated, is taken as the spatial recursive search region of the current pixel block. In other words, a position region (a region of oblique lines in the figure) of pixel blocks scanned before the current pixel block C is taken as a spatial recursive search region. The motion vector of each candidate block in the spatial recursive search region is provided recursively to the current pixel block of the current video frame by using a spatial recursive method for example formula (2) above, so as to serve as a spatial recursive candidate motion vector of the current pixel block. For example, as shown in FIG. 4, assuming that a motion vector of a certain pixel block S is $MV_1$, the motion vector of the pixel block S is provided recursively to the current pixel block C so as to be the spatial recursive candidate motion vector $CMV_s$ of the current pixel block C.

In an embodiment, a motion vector for temporal recursion of the current pixel block may be expressed as the following formula:

$$MV_{temporal}\{MV_{r+i,c+j}|(i>0 \text{ or } (i=0 \text{ and } j>=0), (i,j) \in \Omega_t)\} \quad \text{formula (3)},$$

where $\Omega_t$ denotes a search range in a time domain specified around the current pixel block, (r, c) denotes a position of the current pixel block, (r+i, c+j) denotes a position of a block within the specified search range, and $MV_{temporal}$ denotes a time recursive candidate motion vector of the current pixel block.

In some embodiments, a block region scanned after a temporally adjacent pixel block corresponding to the current pixel block in a video frame immediately preceding the current video frame is taken as a time recursive search region of the current pixel block. As shown in FIG. 4, a blank pixel block region represents the pixel block region scanned after the pixel block corresponding to the current pixel block in the immediately preceding video frame. Taking this blank pixel block region as the time recursive search region of the current pixel block, which in comparison with all pixel blocks of the immediately preceding video frame being selected as the time recursive search region, can improve the speed of the estimation of the motion vector and reduce the computation amount of the estimation of the motion vector. Furthermore, the motion vector of each candidate block in the time recursive search region is provided recursively to the current pixel block of the current video frame by using a time recursive method, for example formula (3) above, so as to serve as a time recursive candidate motion vector of the current pixel block. For example, in the time recursive search range of the current pixel block, it is assumed that a motion vector of a certain pixel block T is $MV_2$, the motion vector of the pixel block T is provided recursively to the current pixel block C as the time recursive candidate motion vector $CMV_t$ of the current pixel block C.

In an embodiment of the present disclosure, a confidence degree for a difference value between each of the spatial recursive candidate motion vector and the temporal recursive candidate motion vector, and the down-sampled candidate motion vector of the current pixel block may be calculated to determine which candidate motion vector is more proximate to the down-sampled candidate motion vector, that is, which candidate motion vector is more likely to be determined as the motion vector of the current pixel block.

The spatial recursive candidate motion vector and the temporal recursive candidate motion vector described above being used as candidate motion vectors of the current pixel block adopts the phenomenon in which motions between the neighboring blocks are relatively continuous, for example, motion directions of the neighboring blocks in the background region are relatively consistent. However, for some variations in the image, such as texture variations, edge variations, etc., it is more desirable that the candidate motion vectors can be more diverging, which helps to find an appropriate motion vector of the current pixel block more accurately.

Accordingly, in some embodiments, a pixel block is at a position specified in a search range around a current pixel block, and a random offset is added to a motion vector of the specified pixel block. For example, a recursive motion vector of a pixel block at a position set in a preset neighborhood around a current pixel block is obtained. The recursive motion vector may be, for example, a temporal recursive candidate motion vector or a spatial recursive candidate motion vector. Then, a random motion offset is added to the recursive motion vector to obtain a random candidate motion vector of the current pixel block.

The random candidate motion vector may be obtained by the following formula:

$$MV_{random} = \{MV_{r+i,c+j} + \Psi | ((i,j) \in \Omega_r)\} \quad \text{formula(4)},$$

where $\Omega_r$ denotes a search range specified around a current pixel block, for example, a preset neighborhood, (r, c) denotes position of the current pixel block, (r+i, c+j) denotes position of a block within the specified search range, $\Psi$ denotes a random motion offset added to a recursive motion vector of a certain surrounding block, and $MV_{random}$ denotes a random candidate motion vector of the current pixel block.

The random candidate motion vector increases the divergence of the motion estimation of the current pixel block, and provides a greater possibility of finding a correct motion vector for the current pixel block.

Further, in an embodiment, with reference to formula (1) above, a confidence degree of each of the other candidate motion vectors except for the down-sampled candidate motion vector in the plurality of candidate motion vectors with respect to the down-sampled candidate motion vector may be calculated. For example, an absolute value of a first difference value between a spatial recursive candidate motion vector and the down-sampled candidate motion vector is calculated, and a first confidence degree of the spatial recursive candidate motion vector with respect to the down-sampled candidate motion vector is obtained according to the absolute value of the first difference value. An absolute value of a second difference value between a temporal recursive candidate motion vector and the down-sampled candidate motion vector is calculated, and a second confidence degree of the temporal recursive candidate motion vector with respect to the down-sampled candidate motion vector is obtained according to the absolute value of the second difference value. An absolute value of a third difference value between a random candidate motion vector and the down-sampled candidate motion vector is calculated, and a third confidence degree of the random candidate motion vector with respect to the down-sampled candidate motion vector is obtained according to the absolute value of the third difference value.

Further, a highest confidence degree among the first confidence degree, the second confidence degree, and the third confidence degree is obtained. The candidate motion vector corresponding to the highest confidence degree is determined as the motion vector of the current pixel block.

In the above embodiment, the motion vector of the current pixel block is obtained by taking the down-sampled candidate motion vector as a reference motion vector, and taking the temporal recursive candidate motion vector, the spatial recursive candidate motion vector and the random candidate motion vector as selection motion vectors. In an embodiment, another candidate motion vector can be obtained by another algorithm, and a confidence degree can be determined according to a difference value between another candidate motion vector and the down-sampled candidate motion vector to obtain the final motion vector of the current pixel block, which also falls within the protection scope of the present disclosure.

In the method for estimating the motion vector of the pixel block according to the embodiments of the present disclosure, the down-sampled candidate motion vector is taken as the reference motion vector, a candidate motion vector most proximate to the down-sampled candidate motion vector is obtained as the motion vector of the current pixel block. Thus, the method can not only ensure reliability of the motion vector, but also ensure accuracy of the motion vector, which can obtain a more suitable motion vector of the current pixel block and improve the reliability of motion estimation, thereby reducing video jitters and improving video smoothness.

An embodiment of a second aspect of the present disclosure provides a non-transitory computer storage medium, on which a computer program is stored. The computer program, when executed by a processor, implements the method for estimating the motion vector of the pixel block according to any of the above embodiments.

Figure 5:
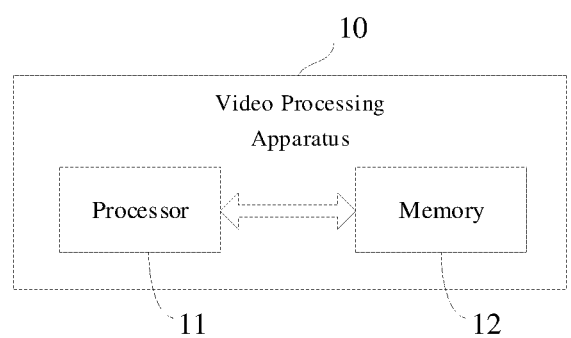
FIG. 5 is a block diagram of a video processing apparatus according to an embodiment of the present disclosure.

An embodiment of a third aspect of the present disclosure provides a video processing apparatus. FIG. 5 is a block diagram of a video processing apparatus according to an embodiment of the present disclosure. The video processing apparatus 10 includes a processor 11 and a memory 12 communicatively connected to the processor 11. The memory 12 stores a computer program executable by the processor 11. The computer program, when executed by the processor 11, implements the method for estimating the motion vector of the pixel block according to any of the above embodiments.

The computer program in the memory 12, when realized in a form of a software function unit and sold or used as an independent product, may be stored in a computer-readable storage medium.

The memory 12, as a computer-readable storage medium, may be configured to store a software program and a computer-executable program, for example, program instructions/modules corresponding to the method in any of the embodiments of the present disclosure. The processor 11 executes a function application and data processing by executing the software program, the instructions and the modules stored in the memory 12, i. e. implements the method for estimating the motion vector of the pixel block in any of the above method embodiments.

The memory 12 may include a program storage area and a data storage area. The program storage area may store an operating system and an application program required by at least one function. The data storage area may store data created according to the use of the terminal device, etc. In addition, the memory 12 may include a high-speed random access memory and a non-temporary memory.

The technical solutions of the embodiments of the present disclosure may be embodied in a form of a computer software product. The computer software product is stored in a storage medium, and includes one or more instructions for enabling a computer device or an image processing device to execute all or part of the steps of the method described in any of the embodiments of the present disclosure.

An embodiment of a fourth aspect of the present disclosure provides an electronic device. In an embodiment, the electronic device may include devices capable of image processing or video processing, and image display, such as a television, a projector, a computer, etc.

Figure 6:
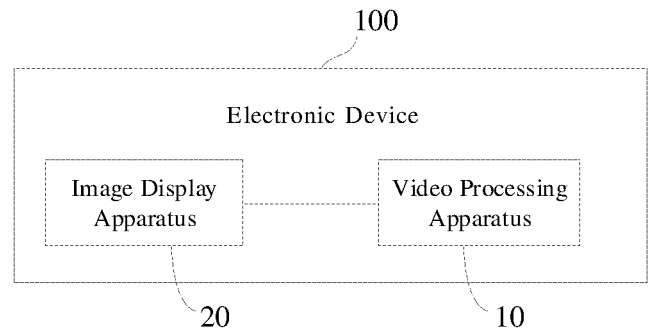
FIG. 6 is a block diagram of an electronic device according to an embodiment of the present disclosure.

As shown in FIG. 6, the electronic device 100 according to the embodiment of the present disclosure includes an image display apparatus 20 and a video processing apparatus 10 according to the above embodiments. The video processing apparatus 10 is connected to the image display apparatus 20. The video processing apparatus 10 processes a video image to be displayed. Specifically, the video processing apparatus 10 may perform the method for estimating the motion vector of the pixel block according to any of the above embodiments, and transmits the processed video image to the image display apparatus 20 in a frame. The image display apparatus 20 is configured to display the video image.

The video processing apparatus 10 is configured to: obtain a plurality of candidate motion vectors of a current pixel block in a current video frame, the plurality of candidate motion vectors including at least a down-sampled candidate motion vector; calculate a confidence degree for a difference value between each of other candidate motion vectors except for the down-sampled candidate motion vector in the plurality of candidate motion vectors and the down-sampled candidate motion vector; determine one candidate motion vector in the other candidate motion vectors as a motion vector of the current pixel block, the confidence degree for the difference value between the one candidate motion vector and the down-sampled candidate motion vector being highest.

The electronic device 100 of the embodiment of the present disclosure, by using the video processing apparatus 10 in any of the above embodiments and taking the down-sampled candidate motion vector as a reference motion vector, can improve the estimation speed and the reliability. The higher the confidence degree for a difference value between one candidate motion vector and the down-sampled candidate motion vector is, the closer the one candidate motion vector gets to the down-sampled candidate motion vector, that is, the more reliable the one candidate motion vector will be. One candidate motion vector in the other candidate motion vectors is determined as the final motion vector of the current pixel block, the confidence degree for the difference value between the one candidate motion vector and the down-sampled candidate motion vector being highest. Thus, it can not only ensure reliability of the obtained motion vector, but also can ensure accuracy of the motion vector, thereby improving reliability of motion estimation, reducing video jitters and improving video quality.

In the illustration of this description, an illustration with reference to the terms "one embodiment", "some embodiments", "illustrative embodiments", "an example", "a particular example" or "some examples" and so on mean that a particular feature, structure, material, or characteristic described in connection with the embodiment(s) or example(s) is included in at least one embodiment or example of the present disclosure. In this description, the exemplary expressions of the above terms do not necessarily specify the same embodiments or examples.

Although embodiments of the present disclosure have been shown and described, it will be understood by those skilled in the art that various changes, modifications, alternations and modifications may be made to these embodiments without departing from the principles and spirit of the present disclosure, the scope of which is defined by the claims and their equivalents.

What is claimed is:

1. A method for estimating a motion vector of a pixel block comprising:
    obtaining a plurality of candidate motion vectors of a current pixel block in a current video frame, the plurality of candidate motion vectors comprising at least a down-sampled candidate motion vector;
    calculating a confidence degree of each of other candidate motion vectors except for the down-sampled candidate motion vector in the plurality of candidate motion vectors with respect to the down-sampled candidate motion vector; and
    determining the candidate motion vector in the other candidate motion vectors which has a highest confidence degree with respect to the down-sampled candidate motion vector as the motion vector of the current pixel block.

2. The method for estimating the motion vector of the pixel block according to claim 1, wherein said obtaining the plurality of candidate motion vectors of the current pixel block in the current video frame comprises:
    obtaining a down-sampled frame image of the current video frame;
    dividing the down-sampled frame image into a plurality of candidate blocks of a same size; and
    calculating, using a hierarchical search algorithm, the down-sampled candidate motion vector of the current pixel block.

3. The method for estimating the motion vector of the pixel block according to claim 2, wherein said obtaining the plurality of candidate motion vectors of the current pixel block in the current video frame further comprises:
    taking a block region in the current video frame, the motion vector of which has been estimated, as a spatial recursive search region of the current pixel block; and
    providing recursively the motion vector of each candidate block in the spatial recursive search region to the current pixel block of the current video frame using a spatial recursive method, so as to serve as a spatial recursive candidate motion vector of the current pixel block.

4. The method for estimating the motion vector of the pixel block according to claim 3, wherein said obtaining the plurality of candidate motion vectors of the current pixel block in the current video frame further comprises:
    taking, in a video frame immediately preceding the current video frame, a block region scanned after a temporally adjacent pixel block corresponding to the current pixel block as a time recursive search region of the current pixel block; and
    providing recursively the motion vector of each candidate block in the time recursive search region to the current pixel block of the current video frame using a time recursive method, so as to serve as a time recursive candidate motion vector of the current pixel block.

5. The method for estimating the motion vector of the pixel block according to claim 4, wherein said obtaining the plurality of candidate motion vectors of the current pixel block in the current video frame further comprises:
    obtaining a recursive motion vector of a pixel block at a position set in a preset neighborhood around the current pixel block; and adding a random motion offset to the recursive motion vector to obtain a random candidate motion vector of the current pixel block.

6. The method for estimating the motion vector of the pixel block according to claim 5, wherein said calculating the confidence degree of each of the other candidate motion vectors except for the down-sampled candidate motion vector in the plurality of candidate motion vectors with respect to the down-sampled candidate motion vector comprises:
calculating an absolute value of a first difference value between the spatial recursive candidate motion vector and the down-sampled candidate motion vector, and obtaining a first confidence degree of the spatial recursive candidate motion vector with respect to the down-sampled candidate motion vector according to the absolute value of the first difference value;
calculating an absolute value of a second difference value between the temporal recursive candidate motion vector and the down-sampled candidate motion vector, and obtaining a second confidence degree of the temporal recursive candidate motion vector with respect to the down-sampled candidate motion vector according to the absolute value of the second difference value; and
calculating an absolute value of a third difference value between the random candidate motion vector and the down-sampled candidate motion vector, and obtaining a third confidence degree of the random candidate motion vector with respect to the down-sampled candidate motion vector according to the absolute value of the third difference value.

7. The method for estimating the motion vector of the pixel block according to claim 6, wherein said determining the candidate motion vector in the other candidate motion vectors which has the highest confidence degree with respect to the down-sampled candidate motion vector as the motion vector of the current pixel block comprises:
obtaining a highest confidence degree among the first confidence degree, the second confidence degree, and the third confidence degree; and
determining the candidate motion vector corresponding to the highest confidence degree as the motion vector of the current pixel block.

8. The method for estimating the motion vector of the pixel block according to claim 2, wherein said calculating, using the hierarchical search algorithm, the down-sampled candidate motion vector of the current pixel block comprises:
calculating a block matching error between each candidate block in a search region in the down-sampled frame image and the current pixel block;
determining a target candidate block having a minimum matching error with respect to the current pixel block; and
estimating a motion vector between the current pixel block and the target candidate block as the down-sampled candidate motion vector.

9. The method for estimating the motion vector of the pixel block according to claim 1, wherein the confidence degree of each of the other candidate motion vectors except for the down-sampled candidate motion vector in the plurality of candidate motion vectors with respect to the down-sampled candidate motion vector is calculated according to $$conf_i = 100 - \min(\alpha \times abs(cmv_i - hmv), 100), i=1,2,\ldots m,$$

where $conf_i$ denotes the confidence degree of an $i^{th}$ candidate motion vector $cmv_i$, $hmv$ denotes the down-sampled candidate motion vector, and a denotes a confidence degree coefficient.

10. The method for estimating the motion vector of the pixel block according to claim 3, wherein the spatial recursive candidate motion vector of the current pixel block is expressed as $$MV_{spatial}\{MV_{r+i,c+j}|(i<0 \text{ or } (i=0 \text{ and } j<0), (i,j)\in\Omega_s)\},$$

denotes a search range in a spatial domain which is specified around the current pixel block, (r, c) denotes a position of the current pixel block, (r+i, c+j) denotes a position of a block within the specified search range, and $MV_{spatial}$ denotes the spatial recursive candidate motion vector of the current pixel block.

11. The method for estimating the motion vector of the pixel block according to claim 4, wherein the time recursive candidate motion vector of the current pixel block is expressed as $$MV_{temporal}\{MV_{r+i,c+j}|(i>0 \text{ or } (i=0 \text{ and } j>=0), (i,j)\in\Omega_t)\}$$

denotes a search range in a time domain specified around the current pixel block, (r, c) denotes a position of the current pixel block, (r+i, c+j) denotes a position of a block within the specified search range, and $MV_{temporal}$ denotes the time recursive candidate motion vector of the current pixel block.

12. The method for estimating the motion vector of the pixel block according to claim 5, wherein the random candidate motion vector is obtained by $$MV_{random} = \{MV_{r+i,c+j} + \Psi | ((i,j)\in\Omega_r)\}$$

where $Q_r$ denotes a search range specified around the current pixel block, (r, c) denotes a position of the current pixel block, (r+i, c+j) denotes a position of a block within the specified search range, $\Psi$ denotes the random motion offset, and $MV_{random}$ denotes the random candidate motion vector of the current pixel block.

13. A non-transitory computer storage medium, on which a computer program is stored, wherein the computer program, when executed by a processor, implements the method for estimating the motion vector of the pixel block according to claim 1.

14. A video processing apparatus comprising:
a processor; and
a memory communicatively connected to the processor, wherein the memory stores a computer program executable by the processor, and the computer program when executed by the processor, implements the method for estimating the motion vector of the pixel block according to claim 1.

15. An electronic device comprising:
an image display apparatus; and
the video processing apparatus according to claim 14, wherein the video processing apparatus is connected to the image display apparatus.

* * * * *